(12) United States Patent
Ogihara et al.

(10) Patent No.: US 12,017,399 B2
(45) Date of Patent: Jun. 25, 2024

(54) TEMPERATURE ADJUSTING DEVICE, TEMPERATURE ADJUSTING METHOD, AND RESIN CONTAINER MANUFACTURING METHOD

(71) Applicant: NISSEI ASB MACHINE CO., LTD., Nagano (JP)

(72) Inventors: Manabu Ogihara, Nagano (JP); Atsushi Nagasaki, Nagano (JP); Kazuhiro Horiuchi, Nagano (JP)

(73) Assignee: NISSEI ASB MACHINE CO., LTD., Nagano (JP)

(*) Notice: Subject to any disclaimer, the term of this patent is extended or adjusted under 35 U.S.C. 154(b) by 187 days.

(21) Appl. No.: 17/427,553

(22) PCT Filed: Jan. 31, 2020

(86) PCT No.: PCT/JP2020/003649
§ 371 (c)(1),
(2) Date: Jul. 30, 2021

(87) PCT Pub. No.: WO2020/158919
PCT Pub. Date: Aug. 6, 2020

(65) Prior Publication Data
US 2022/0097287 A1 Mar. 31, 2022

(30) Foreign Application Priority Data
Jan. 31, 2019 (JP) ................. 2019-015104

(51) Int. Cl.
*B29C 49/64* (2006.01)
*B29B 11/08* (2006.01)
(Continued)

(52) U.S. Cl.
CPC .......... *B29C 49/6427* (2013.01); *B29B 11/08* (2013.01); *B29C 49/643* (2022.05);
(Continued)

(58) Field of Classification Search
CPC .............. B29C 49/6427; B29C 49/643; B29C 49/6458; B29C 49/6463; B29C 49/6465
See application file for complete search history.

(56) References Cited

U.S. PATENT DOCUMENTS

| 3,937,610 A | 2/1976 | Farrell |
| 4,592,719 A | 6/1986 | Bellehache et al. |

(Continued)

FOREIGN PATENT DOCUMENTS

| CN | 1874966 A | 12/2006 |
| JP | 60-212324 | 10/1985 |

(Continued)

OTHER PUBLICATIONS

Office Action issued in corresponding Korean Patent Application No. 10-2021-7025246 dated Jul. 28, 2022, along with English translation thereof.

(Continued)

*Primary Examiner* — Robert B Davis
(74) *Attorney, Agent, or Firm* — Greenblum & Bernstein, P.L.C.

(57) ABSTRACT

A temperature adjustment device and a temperature adjustment method for a preform in a blow molding device with which it is possible to reduce a molding cycle time is provided. A temperature adjustment device for a preform in which a hollow rod member is inserted into an injection-molded, bottomed preform retained by a retention member, and a first air circulation path is formed between the preform and the hollow rod member to adjust the temperature of the preform. The temperature adjustment device is characterized in that a flow path adjustment member is fitted and attached to the outer periphery of the hollow rod member, whereby the cross-sectional area of the first air circulation path is partially adjusted and changed.

14 Claims, 19 Drawing Sheets

(51) Int. Cl.
  *B29C 49/68*   (2006.01)
  *B29C 49/78*   (2006.01)
  *B29L 31/00*   (2006.01)

(52) U.S. Cl.
  CPC ...... *B29C 49/6458* (2022.05); *B29C 49/6463* (2013.01); *B29C 49/6465* (2022.05); *B29C 49/68* (2013.01); *B29C 49/78* (2013.01); *B29C 2949/078* (2022.05); *B29L 2031/7158* (2013.01)

(56) References Cited

U.S. PATENT DOCUMENTS

| | | |
|---|---|---|
| 6,171,541 B1 | 1/2001 | Neter et al. |
| 6,461,556 B2 | 10/2002 | Neter |
| 6,475,415 B1 | 11/2002 | Neter et al. |
| 6,475,422 B1 | 11/2002 | Neter et al. |
| 6,488,878 B1 | 12/2002 | Neter et al. |
| 2001/0005063 A1 | 6/2001 | Neter et al. |
| 2002/0074687 A1 | 6/2002 | Neter et al. |
| 2002/0079620 A1 | 6/2002 | Dubuis et al. |
| 2003/0108638 A1 | 6/2003 | Neter et al. |
| 2007/0085240 A1 | 4/2007 | Miyagi et al. |
| 2014/0131920 A1 | 5/2014 | Nakahara |
| 2016/0361860 A1 | 12/2016 | Nakahara |
| 2018/0079127 A1 | 3/2018 | Aoki |

FOREIGN PATENT DOCUMENTS

| | | |
|---|---|---|
| JP | 04-065214 A | 3/1992 |
| JP | 5-185493 A | 7/1993 |
| JP | 6-278196 A | 10/1994 |
| JP | 6-315973 A | 11/1994 |
| JP | 2003-236923 A | 8/2003 |
| JP | 2005-67206 A | 3/2005 |
| JP | 2011-230293 A | 11/2011 |
| JP | 5692648 | 4/2015 |
| WO | 2013/012067 A1 | 1/2013 |
| WO | 2017/098673 A1 | 6/2017 |

OTHER PUBLICATIONS

Office Action issued in Chinese Patent Application No. 202080023149.5 dated Oct. 27, 2022, along with English translation thereof.
Extended European Search Report issued in European Patent Application No. 20748579.8 dated Sep. 9, 2022.
International Search Report issued in International Patent Application No. PCT/JP2020/003649, dated Apr. 7, 2020, along with English translation thereof.
Written Opinion (PCT/ISA/237) issued in International Patent Application No. PCT/JP2020/003649, dated Apr. 7, 2020, along with English translation thereof.
Office Action Issued in Corresponding CN Patent Application No. 202080023149.5, dated Aug. 1, 2023, along with an English translation thereof.

TEMPERATURE ADJUSTING DEVICE, TEMPERATURE ADJUSTING METHOD, AND RESIN CONTAINER MANUFACTURING METHOD

TECHNICAL FIELD

The present invention relates to a temperature adjusting device and a temperature adjusting method for a preform in a hot parison type blow molding apparatus. Specifically, the present invention relates to a temperature adjusting device and a temperature adjusting method for a preform, and the like capable of performing an appropriate temperature adjustment treatment in a short time even for a preform that has been injection-molded in a short time and demolded in a high-temperature state.

BACKGROUND ART

The related art discloses a blow molding apparatus including an injection molding station configured to injection-mold a preform, a temperature adjustment station configured to adjust a temperature of the preform molded in the injection molding station, and a blow molding station configured to blow-mold the preform whose temperature has been adjusted in the temperature adjustment station (for example, refer to Patent Literature 1). This type of the blow molding apparatus is an apparatus where the temperature adjustment station is added to a conventional blow molding apparatus (for example, refer to Patent Literature 2) mainly including only the injection molding station and the blow molding station. The preform immediately after molded in the injection molding station does not have a temperature distribution suitable for blow molding. Therefore, the temperature adjustment station capable of more positively adjusting a temperature of the preform is provided between the injection molding station and the blow molding station, such that the temperature of the preform can be adjusted to a temperature suitable for blow molding. Note that, the temperature adjustment station uses a heating pot mold (heating block) and a heating rod, and adjusts the temperature of the preform by heating the preform in a non-contact manner.

In addition, there is a temperature adjustment method capable of favorably molding a container having a thick bottom portion by cooling only a bottom portion of a preform in a short time and locally. Specifically, suggested is a blow molding apparatus where a preform is inserted into a cavity of a temperature adjustment pot mold, outer peripheral surfaces of a bottom portion of the preform and a lower body portion continuing to the bottom portion are closely contacted and securely cooled with a cooling pot and a cooling rod arranged below the temperature adjustment pot mold, and a body portion except the lower body portion continuing to the bottom portion is heated to a predetermined temperature by a heating block arranged above the temperature adjustment pot mold, so that a container including a bottom portion having a desired thickness and a body portion having a wall portion stretched in a uniform and thin thickness when performing blow molding is manufactured (for example, refer to Patent Literature 3).

In addition, suggested is a blow molding apparatus configured to shorten an injection molding time (specifically, a cooling time) that determines a molding cycle time by cooling a preform in the injection molding station and further cooling the preform in the temperature adjustment station (for example, refer to Patent Literature 4). Further, recently, a hollow rod is inserted into a preform accommodated in a temperature adjustment pot mold, and cooling air flows in a gap between an outer periphery of the hollow rod and an inner periphery of the preform to cool the entire preform, thereby shortening the molding cycle time and making the container transparent.

CITATION LIST

Patent Literature

Patent Literature 1: JP-A-H06-315973
Patent Literature 2: WO2017/098673
Patent Literature 3: WO2013/012067
Patent Literature 4: JP-A-H0S-185493

SUMMARY OF INVENTION

Technical Problem

However, according to the related art, it is difficult to finely adjust the gap between the outer periphery of the hollow rod and the inner periphery of the preform, so that a cross-sectional area of the gap becomes relatively large. Accordingly, the flow speed of the air is likely to be lowered, so that the cooling efficiency is insufficient. As a result, when a thermoplastic resin, which is likely to crystallize in a temperature zone of the blow molding, is used as a material of the preform, the obtained finished container is not clear and whitening or cloudiness is likely to be caused.

Further, even when the preform conveyed from the injection molding station has temperature unevenness in a circumferential direction, it is difficult to eliminate the same by a treatment in a short time in the temperature adjustment station. As a result, a body portion of the container obtained by blow-molding the preform in a blow molding station, which is a post-step of the temperature adjustment station, has thickness unevenness.

An object of the present invention is to provide a temperature adjusting device for a preform of a blow molding apparatus capable of shortening a molding cycle time and eliminating thickness unevenness of a container while making the container transparent, a flow regulating member that is used for the temperature adjusting device, and the like.

Solution to Problem

A temperature adjusting device for a preform according to the present invention is a temperature adjusting device for adjusting a temperature of an injection molded bottomed preform including: a hollow rod member configured to be inserted in the preform held by a holding member to form a first air flow path between the preform and the hollow rod members, and a flow path adjustment member fitted and attached to an outer periphery of the hollow rod member to adjust a cross-sectional area of the first air flow path at least partially.

A temperature adjusting method for a preform according to the present invention is a temperature adjusting method of holding an injection-molded bottomed preform held by a holding member, and adjusting a temperature of the preform in a temperature adjustment station, the temperature adjusting method including steps of: inserting a hollow rod member to which a flow path adjustment member is attached into the preform to form a first air flow path between the preform and the flow path adjustment member, and inserting the hollow rod member, the flow path adjustment member and the preform into a cavity of a temperature adjustment pot mold, and thereafter allowing cooling air to flow in the first air flow path.

A resin container manufacturing apparatus according to the present invention is a resin container manufacturing apparatus including an injection molding station configured to injection-mold the preform, a temperature adjustment station configured to adjust a temperature of the preform molded in the injection molding station, and a blow molding station configured to blow-mold the preform temperature-adjusted in the temperature adjustment station, in which a hollow rod member is inserted in the preform held by a holding member to form a first air flow path between the preform and the hollow rod member, and a flow path adjustment member is fitted and attached to an outer periphery of the hollow rod member to adjust a cross-sectional area of the first air flow path at least partially.

A resin container manufacturing method according to the present invention is a resin container manufacturing method for holding an injection-molded bottomed preform by a holding member, adjusting a temperature of the preform in a temperature adjustment station, and thereafter blow-molding the preform, the manufacturing method including steps of: inserting a hollow rod member to which a flow path adjustment member is attached into the preform to form a first air flow path between the preform and the flow path adjustment member during temperature adjustment in temperature adjustment station, and inserting the hollow rod member, the flow path adjustment member and the preform into a cavity of a temperature adjustment pot mold, and thereafter allowing cooling air to flow in the first air flow path.

Advantageous Effects of Invention

According to the present invention, it is possible to provide the temperature adjusting device and temperature adjusting method for a preform, and the like capable of shortening a molding cycle time and eliminating thickness unevenness of the finished container while making the container transparent.

BRIEF DESCRIPTION OF DRAWINGS

FIG. 10 is a cross-sectional view corresponding to FIG. 4 when the flow regulating rod shown in FIG. 9(A) and FIG. 9(B) is used in the temperature adjustment station.

FIG. 15(C) is applied.

DESCRIPTION OF EMBODIMENTS

Hereinafter, favorable embodiments of the present invention will be described with reference to the drawings.

First Embodiment

Figure 1:
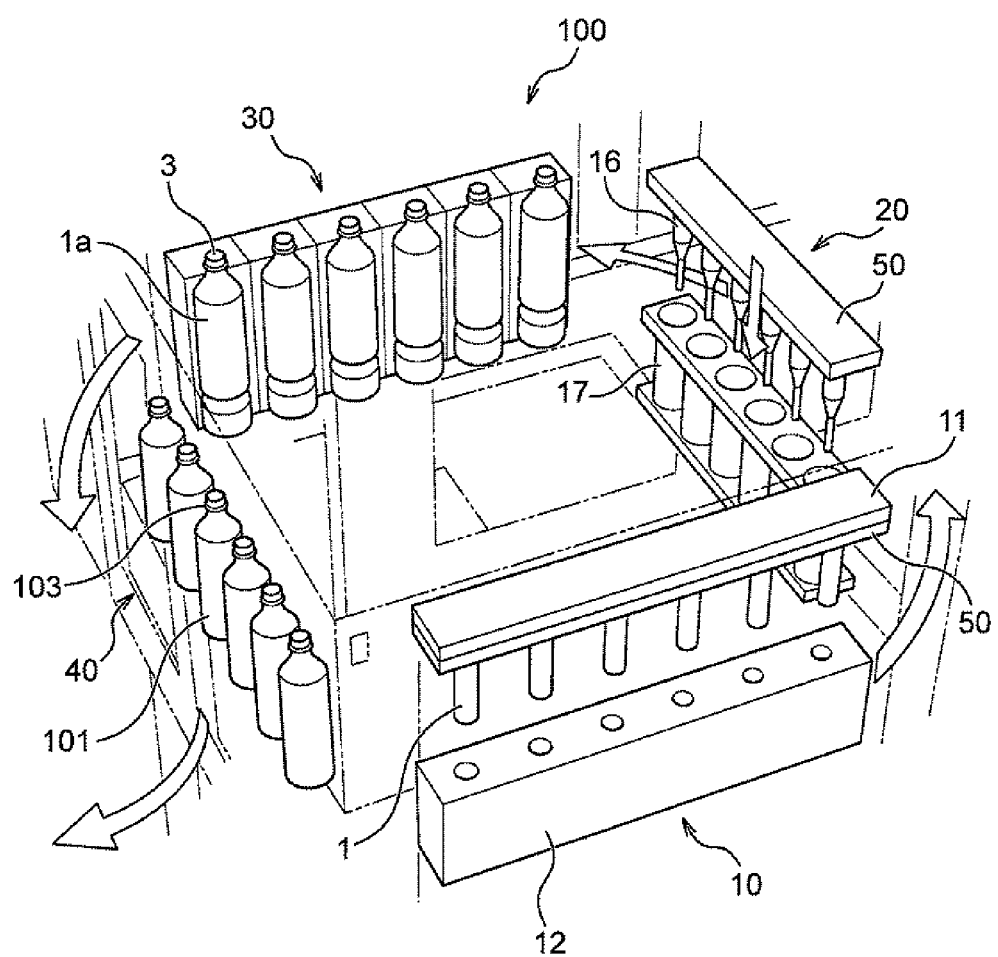
FIG. 1 is a perspective view of a blow molding apparatus, which is an example of a manufacturing apparatus of a resin container to which a temperature adjusting device for a preform according to an embodiment of the present invention is applied.
Figure 2:
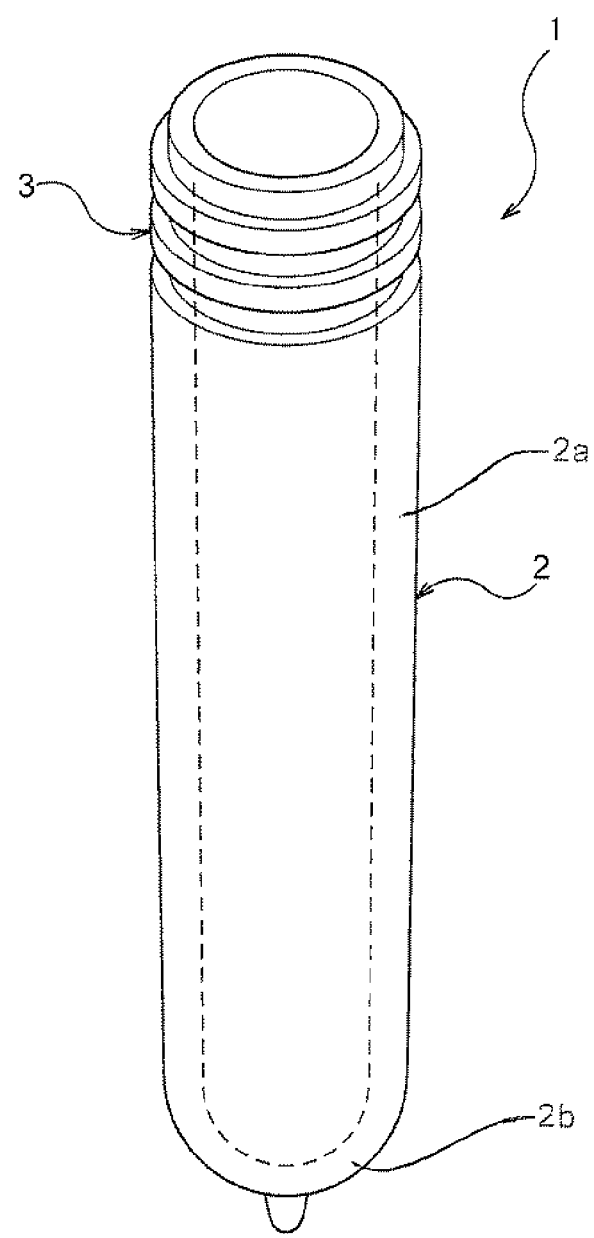
FIG. 2 is a perspective view of an example of a preform injection-molded in an injection molding station.
Figure 3:
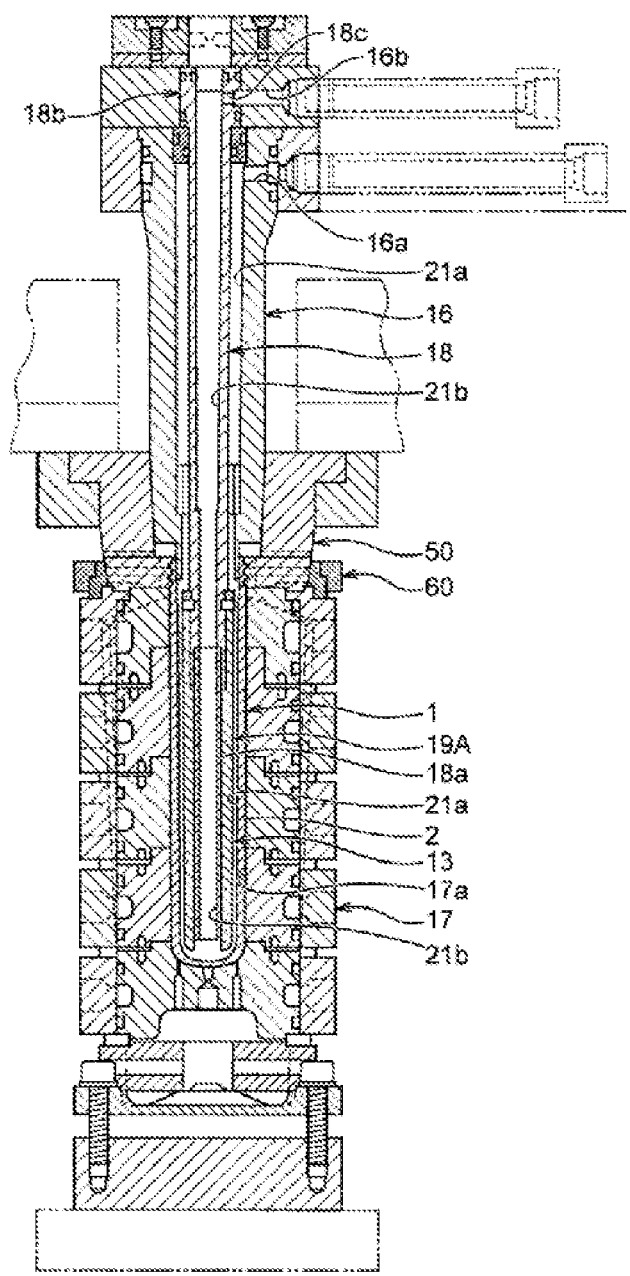
FIG. 3 is a cross-sectional view of a temperature adjustment station, as seen from the front.
Figure 4:
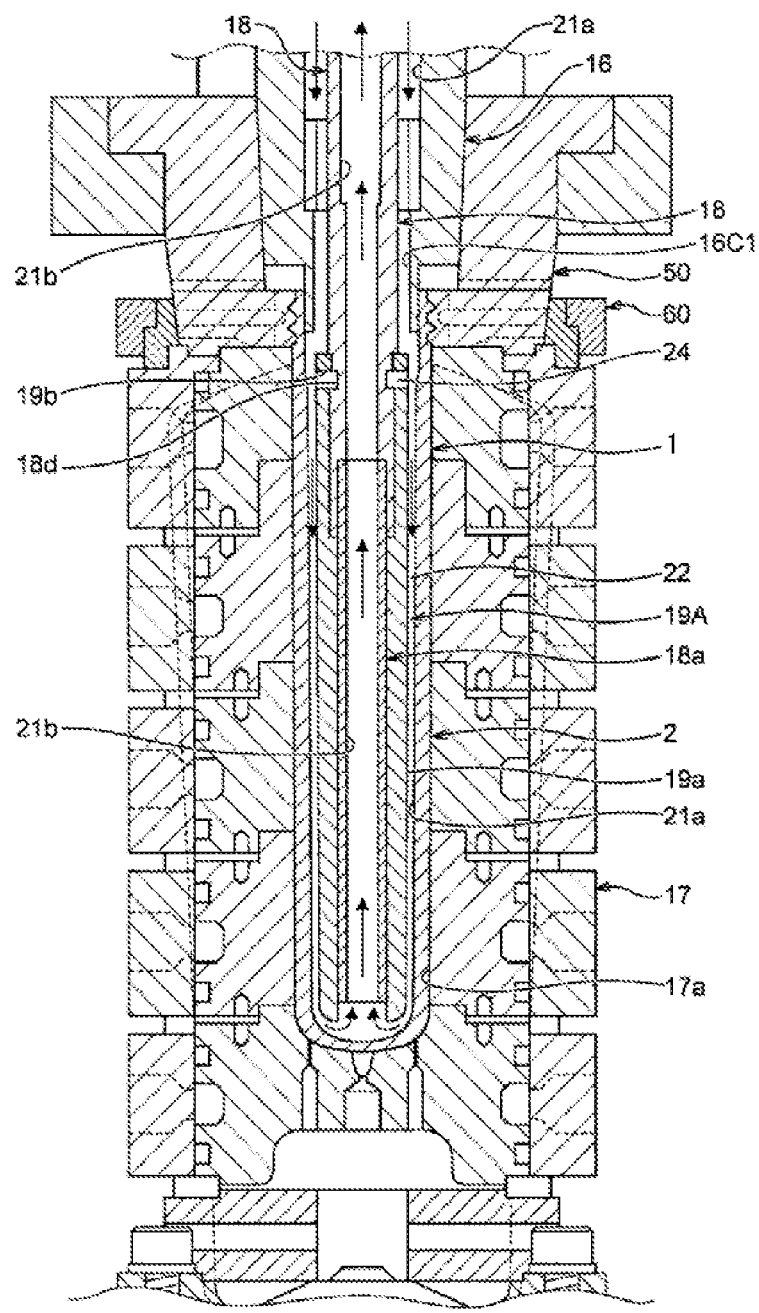
FIG. 4 is an enlarged cross-sectional view of main parts in FIG. 3.

FIG. 1 is a perspective view of a blow molding apparatus, which is an example of a manufacturing apparatus of a resin container to which a temperature adjusting device for a preform according to an embodiment of the present invention is applied, FIG. 2 is a perspective view of a preform injection-molded in an injection molding station, FIG. 3 is a cross-sectional view of a temperature adjustment station, as seen from the front, and FIG. 4 is an enlarged cross-sectional view of main parts in FIG. 3.

As shown in FIG. 1, a blow molding apparatus 100 is an apparatus including an injection molding station 10, a temperature adjustment station 20, a blow molding station 30, and a take-out station 40, and configured to manufacture a container 101 (refer to FIGS. 1 and 17) by injection-molding a preform 1 in the injection molding station 10 and then blow-molding the preform in the blow molding station 30.

The injection molding station 10, the temperature adjustment station 20, the blow molding station 30 and the take-out station 40 are arranged in alignment of forming four sides of a square, as seen from above. A rotation plate (not shown) provided with a neck mold 50 (refer to FIG. 3) configured to hold a neck portion 3 (refer to FIG. 2) of a preform 1 molded in the injection molding station 10 is provided above these stations. The rotation plate includes four sets of neck molds 50 arranged in alignment of forming four sides of a square, as seen from above. Thereby, when the rotation plate is rotated about a vertical shaft in a counterclockwise direction by 90° above the injection molding station 10, the temperature adjustment station 20, the blow molding station 30 and the take-out station 40, each step is performed for the preform 1 held with the neck mold 50.

The injection molding station 10 includes an injection core mold 11, an injection cavity mold 12 and an injection device (not shown), and is configured to injection-mold the preform 1. The injection core mold 11 and the injection cavity mold 12 are each provided with a cooling circuit (not shown), and a cooling medium of about 5° C. to 20° C. flows therethrough.

As shown in FIG. 2, the preform 1 is formed of a thermoplastic synthetic resin and has a bottomed shape (bottomed hollow shape) having a neck portion 3 on an open side and a storage portion 2 (main body portion) 2 on a closed side. The storage portion 2 is constituted by a body portion 2a continuing to the neck portion 3 on the release side, and a bottom portion 2b positioned on the closed side and continuing to the body portion 2a. The preform 1 is formed into a finished container 101 such as a PET bottle (refer to FIGS. 1 and 17) by blow molding, and has a shape having a thick thickness, which is obtained by shrinking the blow-molded container 101 in an upper and lower direction and in a right and left direction in FIG. 17.

The injection molding station 10 is configured to form a surface layer (also appropriately referred to as an outer portion layer, an outer layer or a skin layer) on the storage portion 2 and to mold the preform 1 by heating and melting a material of a thermoplastic synthetic resin (for example, a polyester-based resin such as PET (polyethylene terephthalate)) at a high temperature, injecting (filling) the melted material into a molding space (cavity) defined by the injection core mold 11 and the injection cavity mold 12 and neck mold 50 by the injection device (not shown), and cooling and solidifying the material of a part, which is close to a cavity surface, of the injected material to a temperature, for example, about 20° C., which is lower than a melting point (for example, about 255° C. in the case of PET). At this time, an inner portion layer (also appropriately referred to as an inner layer or a core layer) of the storage portion 2 of the preform 1 is maintained at a temperature (for example, 150° C. to 200° C.) equal to or lower than the melting point and equal to or higher than a glass transition temperature, and is adjusted to have an amount of heat (residual heat) by which the storage portion 2 can be stretched in the blow molding station 30. In the present embodiment, a molding cycle time, i.e., a molding time of the preform 1 is shortened, as compared to the related art. Specifically, a cooling time of an injection time (filling time) and a cooling time relating to the injection molding time of the preform is set considerably shorter than the related art. For example, the cooling time is set to ⅔ or less, preferably ½ or less, and more preferably ⅓ or less of the injection time.

The preform 1 solidified to some extent after injection-molded in the injection molding station 10 is lifted together with the rotation plate with being held on the neck mold 50, is pulled out (demolded) from the injection cavity mold 12 and the injection core mold 11, and is conveyed to the temperature adjustment station 20 as the rotation plate is rotated in the counterclockwise direction by 90°, as shown in FIG. 1.

The temperature adjustment station 20 is arranged next to the injection molding station 10, and includes an upper tubular air nozzle 16 and a lower temperature adjustment pot mold 17, as shown in FIGS. 3 and 4. A lower end of the air nozzle 16 is in airtight contact with the neck portion 3 of the preform 1. The temperature adjustment pot mold 17 is constituted by a plurality of stages (temperature adjustment blocks) in the upper and lower direction so as to adjust the temperature of the preform 1 in the upper and lower direction. In each of the stages, a temperature adjustment medium (cooling medium) of different temperatures (for example, predetermined temperatures within a range of 10° C. to 90° C.) can be circulated.

In the below, an internal configuration of the tubular air nozzle 16 is described.

Figure 5:
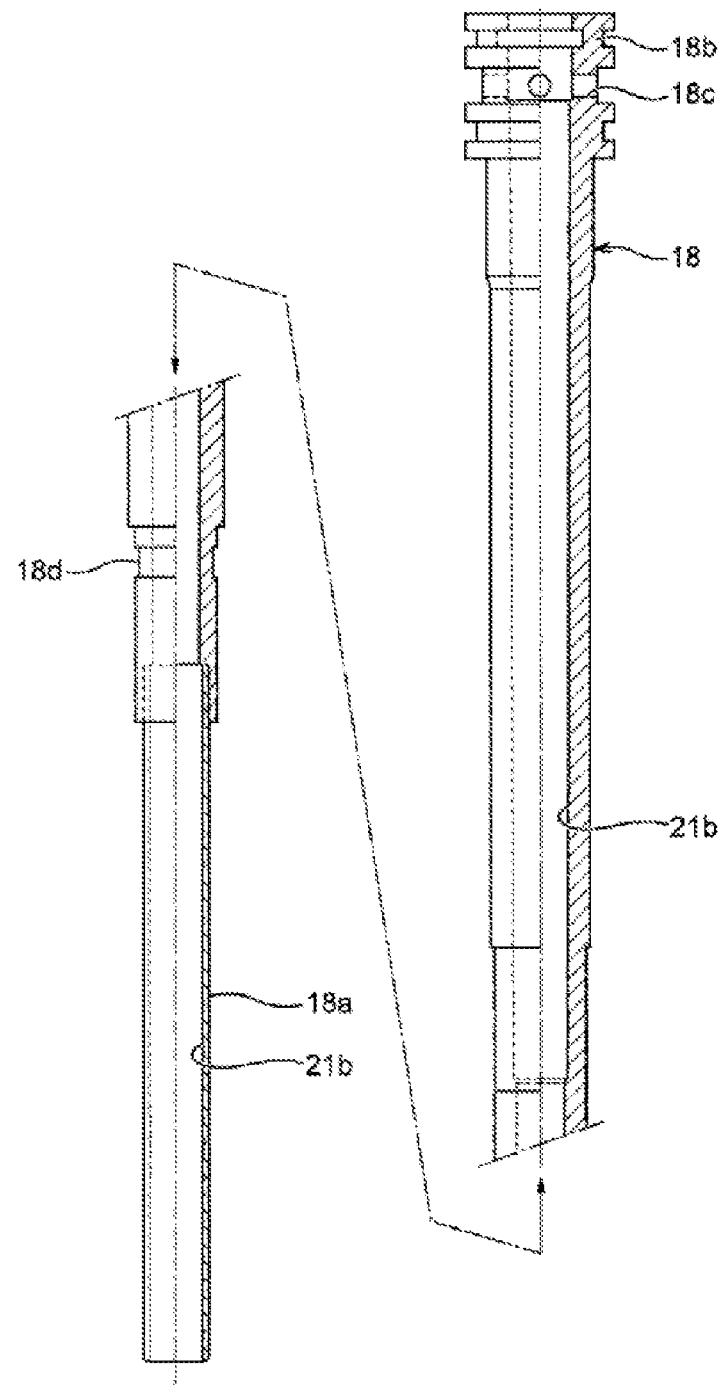
FIG. 5 is a front view of a hollow rod of the temperature adjustment station.

A reference sign 18 indicates a hollow rod that is inserted in the preform 1, and as shown in FIGS. 3 to 5, the hollow rod has a sleeve (hollow piece) 18a fitted and fixed to a lower end, and is fixed concentrically to the tubular air nozzle 16 by an upper fixing portion 18b. As shown in FIG. 5, the hollow rod 18 has a cooling air outlet hole 18c at an upper end, a lower circumferential groove 18d, and an internal air flow path 21b. The sleeve 18a is provided in a case where an axis length of the preform 1 is long, and may not be provided in a case where the length of the preform 1 is short.

Figure 6:
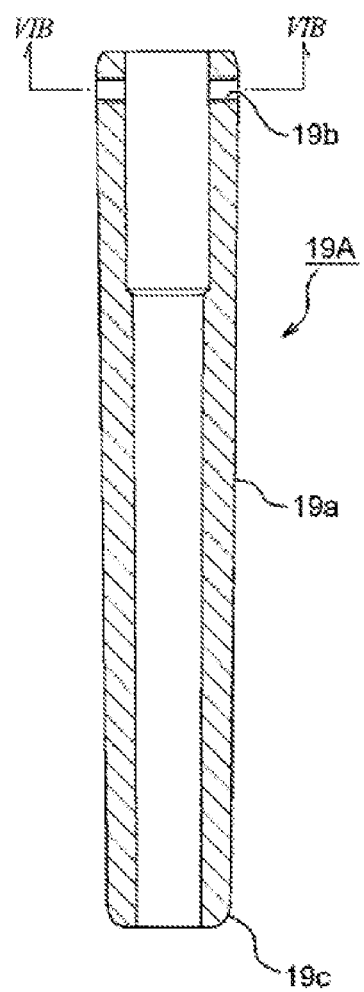
FIG. 6(A) is a front view of a first embodiment of a flow regulating rod that is used in the temperature adjustment station.
FIG. 6(B) is a cross-sectional view taken along a line VIB-VIB in FIG. 6(A).
Figure 6:
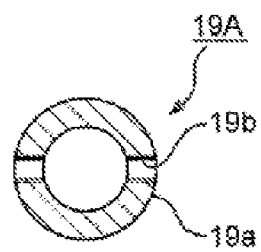

A reference sign 19A indicates a first embodiment of a tubular flow path adjustment rod (hereinafter, appropriately referred to as 'flow regulating rod'), and as shown in FIGS. 4 and 6, the flow regulating rod has an outer periphery 19a having a true circular section (refer to section (B) in FIG. 6), has a truncated conical shape whose outer diameter gradually decreases from an upper portion toward a lower portion, and has an engaged portion (screw hole) 19b provided at an upper end and a relatively large curved surface provided on an outer periphery of a lower end 19c for smooth flow of cooling air, which will be described later. An inclination angle of the truncated cone is determined according to an inclination angle of an inner periphery of the preform 1, but in this case, is for example 0.34° with respect to an axis line.

As shown in FIGS. 3 and 4, the flow regulating rod 19A is commonly fitted and attached to a lower end of the hollow rod 18 and an outer periphery of the sleeve 18a, and is strongly fixed by engaging an engaging member (screw) 24 (refer to FIG. 4) to the circumferential groove 18d through the engaged portion (screw hole) 19b at an upper end of the flow regulating rod 19A. Therefore, since the flow regulating rod 19A can be easily attached and detached with respect to the hollow rod 18 by a screw fixing manner or the like, it is possible to attach a variety of different flow regulating rods to the same hollow rod 18 in an exchangeable manner. Therefore, it is not necessary to prepare different types of the hollow rods, so that it is possible to reduce the cost and the operation man-hour. In this way, the air nozzle 16, the hollow rod 18 and the flow regulating rod 19A are integrally configured (hereinafter, the integral configuration is appropriately referred to as 'air introduction/discharge member'), and are integrally moved up and down by a drive device (not shown).

In addition, as described later, when inserting the preform 1 supported by the neck mold 50 into a pot cavity 17a (refer to FIG. 4) of the temperature adjustment pot mold 17 and moving down and bringing the air introduction/discharge member into contact with the neck portion 3, a first air flow path 21a having a ring-shaped cross-section through which the cooling air (compressed air) introduced from a cooling air inlet 16a (refer to FIG. 3) flows in an inner periphery of the air nozzle 16 is formed between an outer periphery of the flow regulating rod 19A and an inner periphery of the preform 1, and a second air flow path 21b through which the air after cooling that moves to a radially inner side at a lower end portion of the flow regulating rod 19A is sequentially guided inside the sleeve 18a and inside the hollow rod 18 upward from a lower end opening of the sleeve 18a is formed. The air after cooling is discharged to an outside from an air outlet 16b through the upper cooling air outlet hole 18c (refer to FIG. 3). In some cases, the air may be introduced from the second air flow path 21b and may be discharged through the first air flow path 21a. A space of the first air flow path 21a which is formed between the flow regulating rod 19A and the inner periphery of the preform 1 is referred to as a ring-shaped gap 22 (refer to FIG. 4). A radial dimension of the ring-shaped gap 22 is smaller than a radial dimension between the hollow rod 18 and the air nozzle 16 on an upstream side, and is set to a range of 0.5 mm to 1.5 mm, preferably 0.5 mm to 1.0 mm, for example. Therefore, the air flow passing through the ring-shaped gap 22 is throttled and flows at a higher speed than the upstream side. Specifically, by using the flow path adjustment rod, it is possible to increase the speed of the cooling air and to regulate the flow of the cooling air in the ring-shaped gap 22, as compared to the upstream side.

Subsequently, operations of the temperature adjusting device for a preform of the present invention are described.

As shown in FIGS. 3 and 4, the preform 1 supported by the neck mold 50 is conveyed from the injection molding station 10 and is inserted into the cavity 17a of the temperature adjustment pot mold 17. Before and after that, the air introduction/discharge member is moved down, and the hollow rod 18 and the flow regulating rod 19 are inserted into the preform 1. At this time, the neck mold 60 is centered with respect to a centering ring 60 attached on the temperature adjustment pot mold 17.

In addition, as described above, the first air flow path 21a (ring-shaped gap 22) into which the cooling air is caused to flow, and the second air flow path 21b through which the air after cooling the preform 1 flows are formed.

In FIG. 3, for example, the cooling air of room temperatures (for example, 10° C. to 20° C.) passes through the first air flow path 21a, i.e., the ring-shaped gap 22 at relatively high speed from the air inlet 16a, thereby giving a large cooling effect to the main body portion 2 (the body portion 2a and the bottom portion 2b) of the preform 1 to lower the temperature of the preform 1 to an appropriate temperature suitable for a next blow step. Before allowing the cooling air to flow in the preform 1 to cool the preform, the compressed air may be separately introduced into the preform 1 to bring the preform 1 into close contact with the cavity 17a of the temperature adjustment pot mold 17. Thereby, the preform 1 can be cooled from an inner side thereof and can be securely temperature-adjusted from an outer side thereof, so that it is possible to improve the efficiency of removing the temperature unevenness and equalizing the temperature, in addition to the cooling effect. The air after cooling smoothly changes the flow direction toward a radially inner side at the lower end of the first air flow path 21a, i.e., at the lower end 19c of the flow regulating rod, further rises through the second air flow path 21b in the sleeve 18a and is then discharged to an outside from the air outlet 16b.

According to this configuration, when comparing the related art where the flow regulating rod is not provided and the present invention where the flow regulating rod 19A is provided, the radial dimension of the ring-shaped gap 22 of the present invention is finely adjusted smaller by a dimension corresponding to the flow regulating rod 19A, as compared to the case where the flow regulating rod is not provided, like the related art. Therefore, the flow rate of the cooling air passing through the first air flow path 21a increases and the cooling efficiency of the preform is improved.

Even when a cross-sectional area of the ring-shaped gap of the related art is relatively large, it is possible to increase an air pressure or an amount of air supply to further increase the flow rate of the cooling air. However, in this case, an amount of air to be consumed increases.

Second Embodiment

Figure 7:
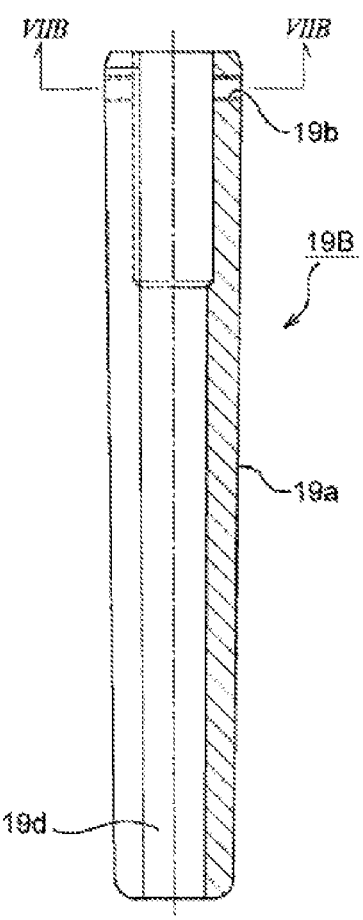
FIG. 7(A) is a partially front cross-sectional view of a second embodiment of the flow regulating rod.
FIG. 7(B) is a cross-sectional view taken along a line VIIB-VIIB in FIG. 7(A).
Figure 7:
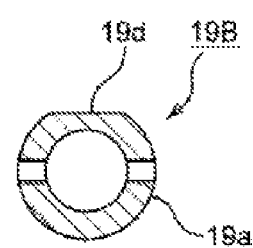

FIG. 7 shows a flow regulating rod 19B that is a second embodiment of the flow regulating rod. The flow regulating rod 19B has a notched portion 19d provided at at least one place in the circumferential direction of the outer periphery and extending in the axis direction.

Figure 19:
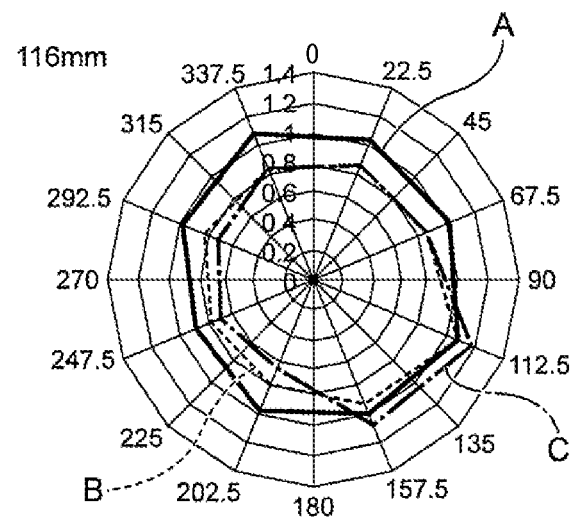
FIG. 19(A) and FIG. 19(B) show first and second test data showing a thickness unevenness state of the finished container, respectively.
Figure 19:
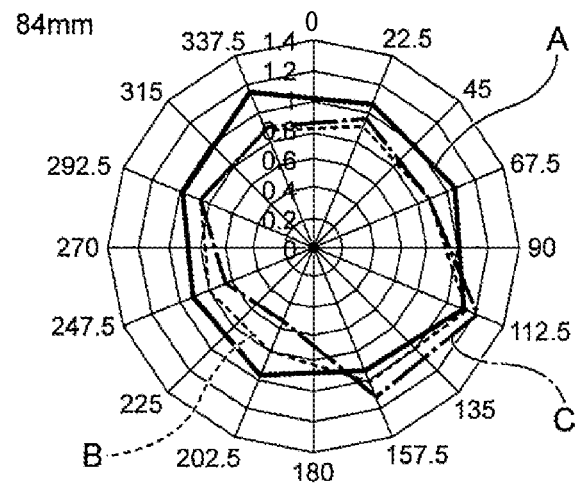

A test is performed using the flow regulating rod 19B having the notched portion 19d (refer to sections (A) and (B) in FIG. 19). As a result, it is observed that a thickness of the container 101 of a portion of the storage portion 2 of the preform corresponding to the notched portion 19d tends to be larger than a thickness of a portion, which does not correspond to the notched portion. This will be described later in detail.

Third Embodiment

Figure 8:
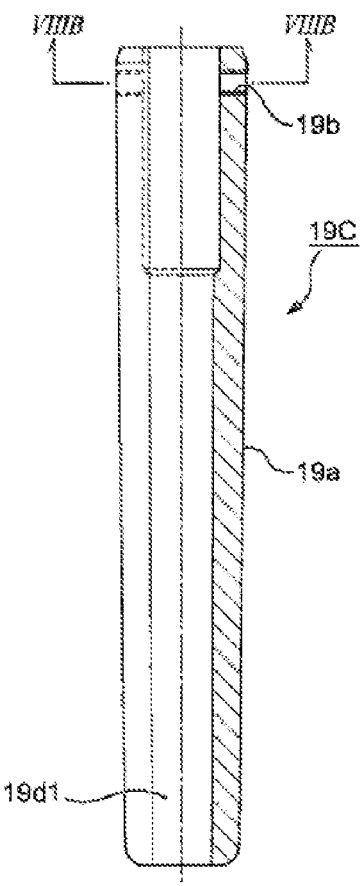
FIG. 8(A) is a partially front cross-sectional view of a third embodiment of the flow regulating rod.
FIG. 8(B) is a cross-sectional view taken along a line VIIIB-VIIIB in FIG. 8(A).
Figure 8:
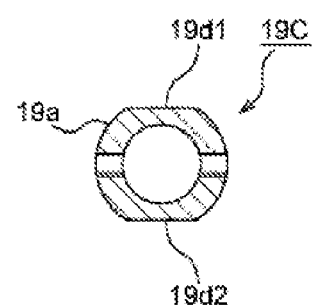

FIG. 8 shows a flow regulating rod 19C that is a third embodiment of the flow regulating rod.

The flow regulating rod 19C has notched portions 19d1 and 19d2 provided at two places in the circumferential direction of the outer periphery and extending in the axis direction. Therefore, a thickness of the container 101 at two places of the storage portion 2 of the preform corresponding to the two notched portions 19d1 and 19d2 becomes larger than a thickness of a portion, which does not correspond to the notched portions. The notched portion 19d may also be provided at three or more places in the circumferential direction of the outer periphery.

Fourth Embodiment

Figure 9:
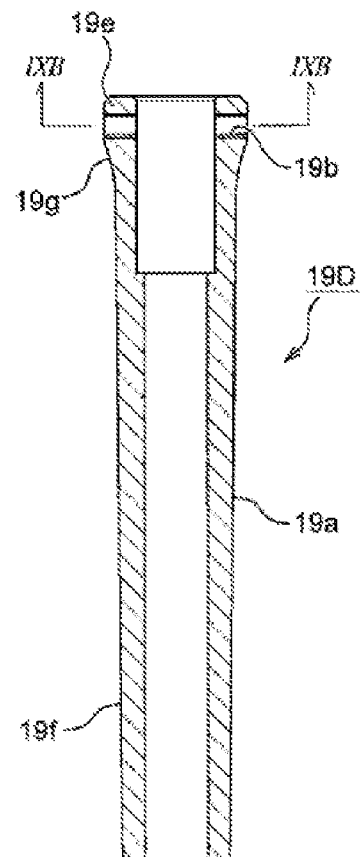
FIG. 9(A) is a partially front cross-sectional view of a fourth embodiment of the flow regulating rod.
FIG. 9(B) is a cross-sectional view taken along a line IVB-IXB in FIG. 9(A).
Figure 9:
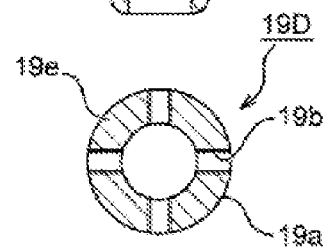

FIG. 9 shows a flow regulating rod 19D that is a fourth embodiment of the flow regulating rod.

The flow regulating rod 19D has a large-diameter portion 19e of an upper end, a small-diameter portion 19f of a lower portion in the axis direction, and a substantially tapered portion 19g connecting both the portions.

Figure 10:
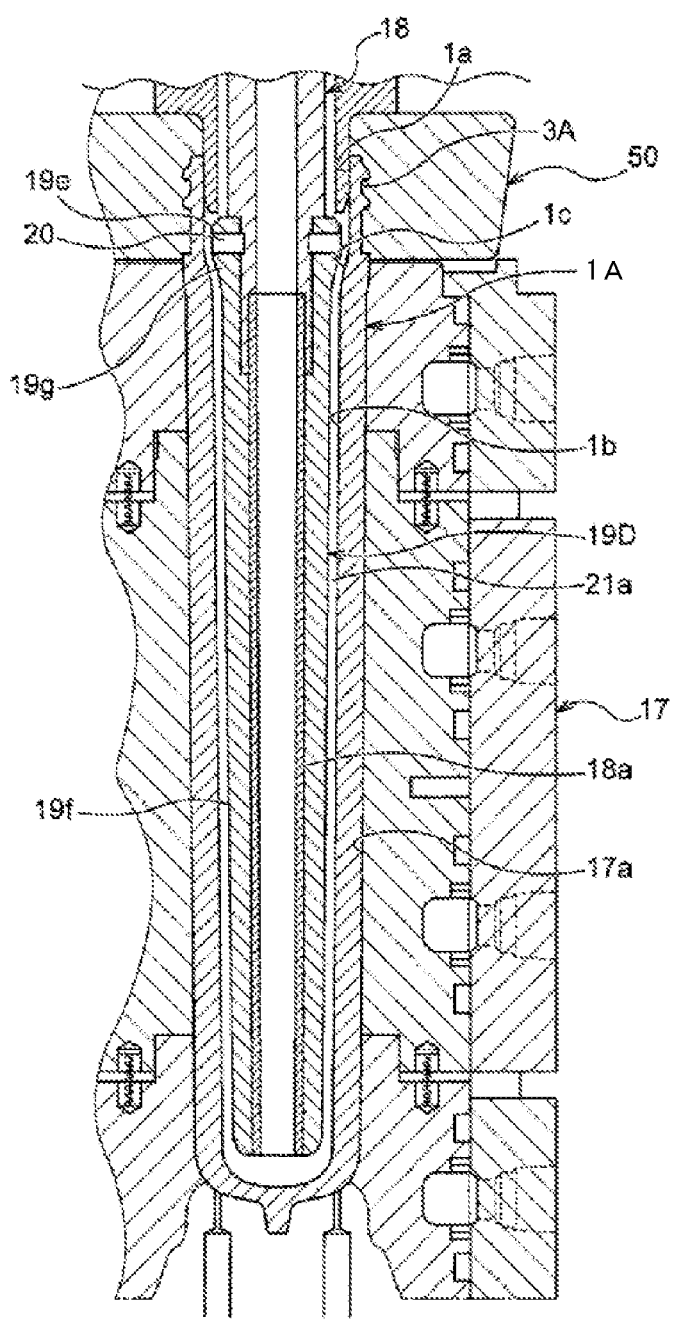

FIG. 10 shows a state in which the flow regulating rod 19D is attached to the hollow rod 18 and the sleeve 18a and is inserted in the cavity 17a of the temperature adjustment pot mold 17 together with a preform 1A different from the preform 1 held by the neck mold 50, and the parts in FIG.

10, which are the same as FIG. 4, are denoted with the same reference signs, and the descriptions thereof are omitted. The second preform 1A has a substantially tapered inner diameter portion 1c connecting a large inner diameter portion 1a at a place of a neck portion 3A and a lower small inner diameter portion 1b.

Therefore, the large-diameter portion 19e, the tapered portion 19g and the small-diameter portion 19f of the flow regulating rod 19D each contact the three inner diameter portions 1a, 1c and 1b of the preform 1A with substantially uniform gap dimensions while sequentially conforming to the shapes of the inner diameter portions, so that it is possible to provide the first air flow path 21a having a uniform cross-sectional area along a flow of the cooling air and to give the uniform cooling effect along the axis direction of the preform 1A.

Fifth Embodiment

Figure 11:
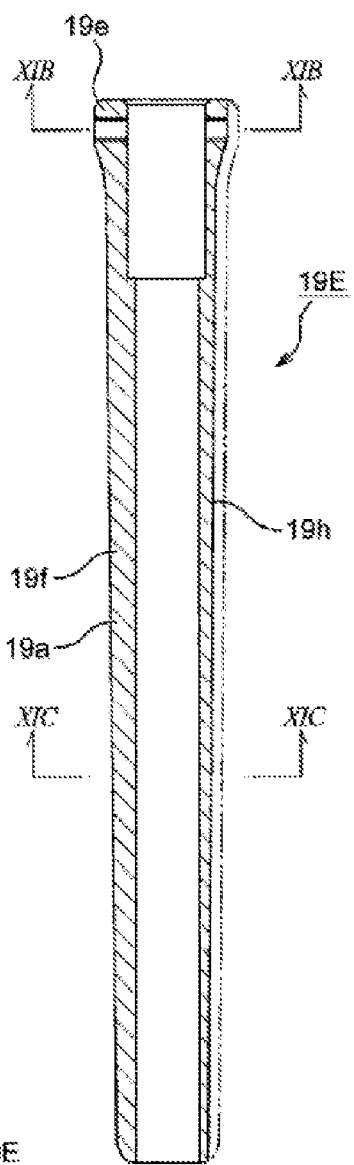
FIG. 11(A) is a front cross-sectional front view of a fifth embodiment of the flow regulating rod.
FIGS. 11(B) and 11(C) are respectively cross-sectional views taken along a line XIB-XIB and a line XIC-XIC in FIG. 11(A).
Figure 11:
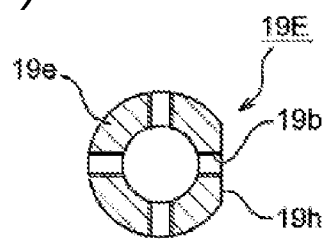
Figure 11:
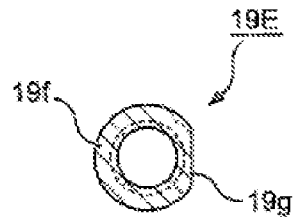

FIG. 11 shows a flow regulating rod 19E that is a fifth embodiment of the flow regulating rod.

The flow regulating rod 19E has the same shape as the flow regulating rod 19D of FIG. 9 but further has a notched portion 19h provided at one place in the circumferential direction of the outer periphery and extending in the axis direction. The notched portion 19h may also be provided at two or more places in the circumferential direction of the outer periphery.

According to this configuration, the effects similar to the notched portion 19d (19d1 and 19d2) of the third and fourth embodiments (FIGS. 7 and 8) are achieved.

In each of the above embodiments, the cross-sectional shape of the flow regulating rod 19 is basically circular but is not limited thereto and may be elliptical or polygonal. In addition, the elliptical or polygonal shape may be further provided with one or more notched portions.

Further, in each of the above embodiments, the notched portions 19d and 19h are linear but are not limited thereto. For example, a variety of shapes such as a curved shape or a concavo-convex shape may also be adopted.

Sixth Embodiment

Figure 12:
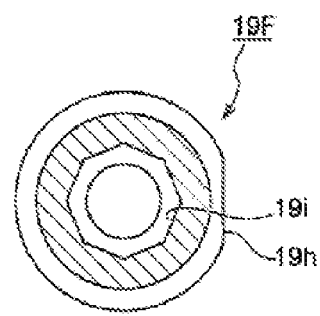
FIG. 12(A) is a cross-sectional view taken along a line XIIA-XIIA in FIG. 12(B)
FIG. 12(B) is a front cross-sectional view of a sixth embodiment of the flow regulating rod.
FIG. 12(C) is a cross-sectional view taken along a line XIIC-XIIC in FIG. 12(B).
Figure 12:
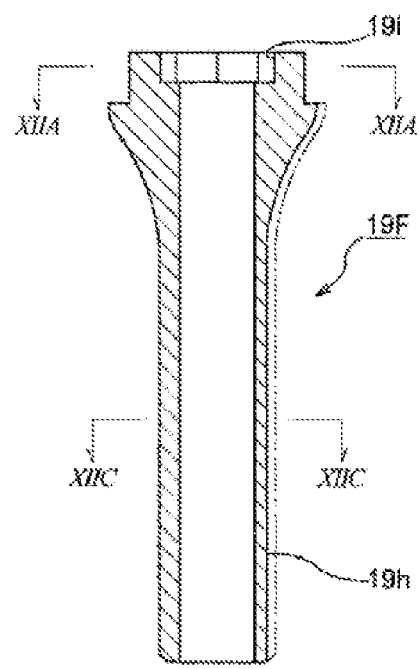
Figure 12:
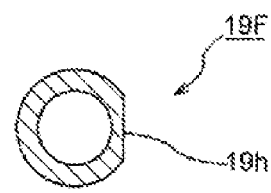

Sections (A) to (C) in FIG. 12 show a flow regulating rod 19F that is a sixth embodiment of the flow regulating rod.

The flow regulating rod 19F has a polygonal (for example, regular octagonal) engaging concave portion 19i provided at an upper end. The polygonal engaging concave portion 19i has a plurality of (eight) substantially rectangular inner surface portions.

Figure 13:
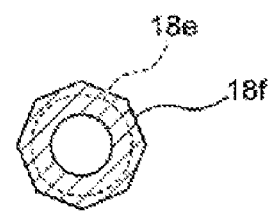
FIG. 13(A) is a cross-sectional view taken along a line XIIIA-XIIIA in FIG. 13(B)
FIG. 13(B) is a front cross-sectional view of an example of a hollow rod to which the flow regulating rod shown in FIGS. 12(A) and 12(B) is applied.
Figure 13:
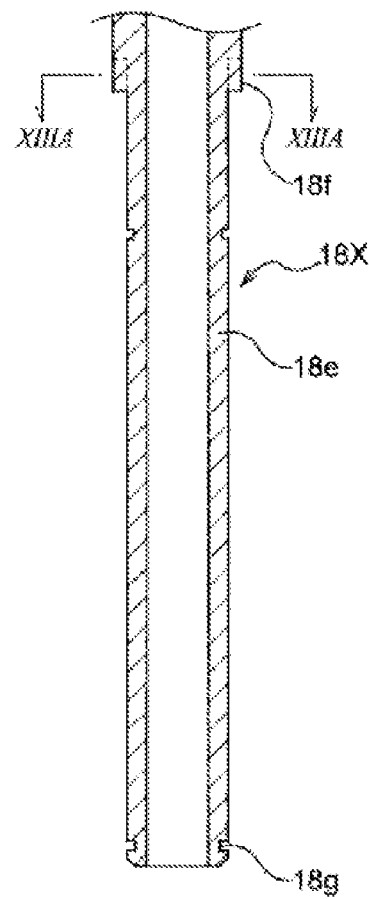
Figure 14:
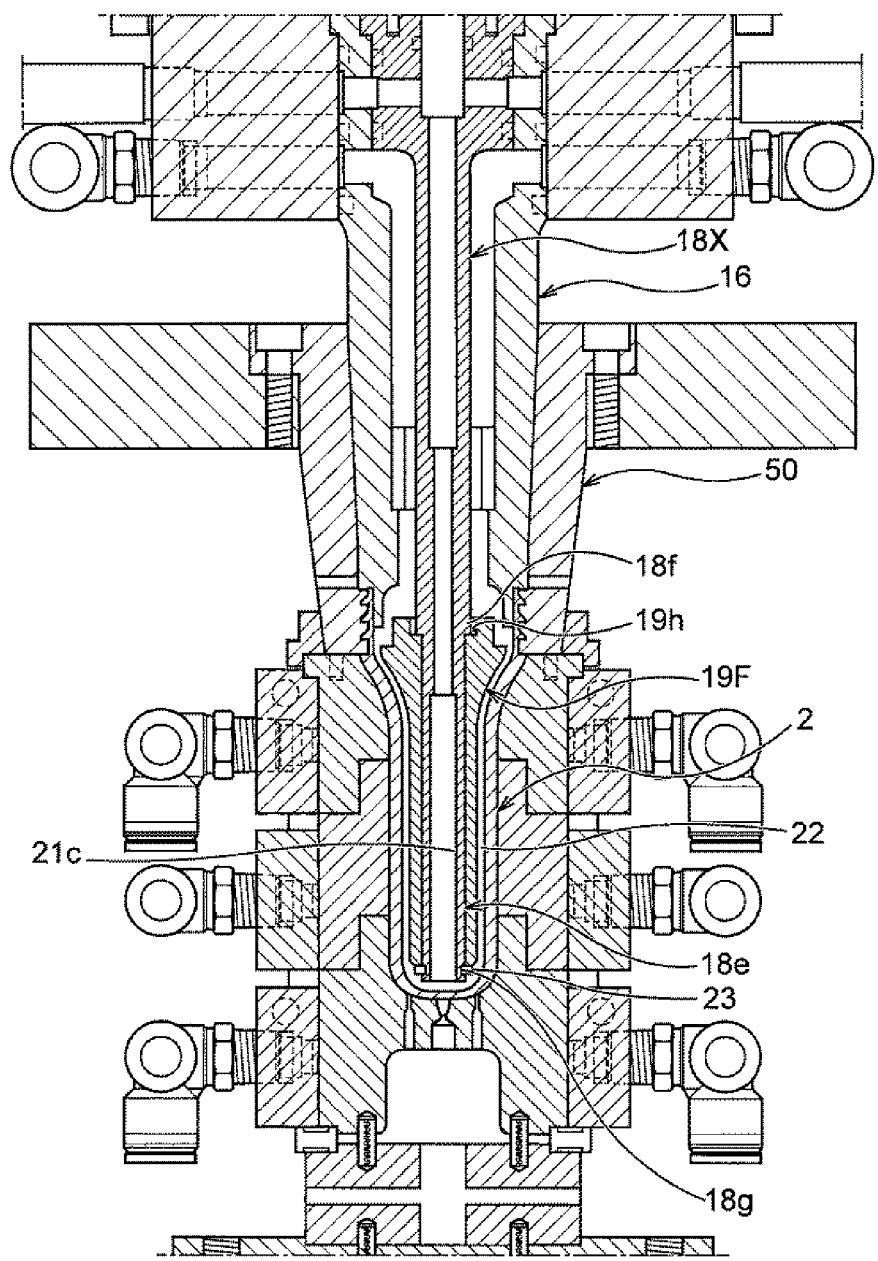
FIG. 14 is a cross-sectional view corresponding to FIG. 4 when the flow regulating rod and the hollow rod shown in FIG. 13(A), FIG. 13(B), FIG. 15(A), FIG. 15(B), and FIG. 15(C) are used in the temperature adjustment station.

FIG. 13 shows a hollow rod 18X for attaching the flow regulating rod 19F. In the embodiment shown in FIGS. 4 and 10, the sleeve 18a that is a separate member is attached to the lower end of the hollow rod 18. However, the hollow rod 18X has a sleeve portion 18e integrally provided at a lower end, and is formed with an engaging convex portion 18f consisting of a polygonal prismatic column portion in a height position on the way. The prismatic column portion has a plurality of (eight) substantially rectangular outer surface portions. Therefore, as shown in FIG. 14, the flow regulating rod 19F is fitted to the sleeve portion 18e of the hollow rod 18X from below in FIG. 14 (from a place of an opening end where the compressed air flows in and out), so that the polygonal engaging concave portion 19i is oriented and engaged with the polygonal convex portion 18f of the hollow rod 18X based on polygonal engagement. More specifically, the plurality of inner surface portions of the engaging concave portion 19i and the plurality of outer surface portions of the prismatic column portion of the polygonal engaging convex portion 18f are contacted each other, and the flow regulating rod 19F is engaged to the hollow rod 18X with being oriented (positioned) to a predetermined angle position in the circumferential direction. In addition, a lower end of the flow regulating rod 19F is supported by an engaging member (retaining ring) 23 (refer to FIG. 14) attached to an engaging concave portion 18g for the retaining ring at a lower end of the sleeve portion 18e, and is engaged to the hollow rod 18X.

According to this configuration, in FIG. 14, the gap dimension of the ring-shaped gap 22 is slightly different according to the angle positions in the circumferential direction, so that it is possible to change a degree of cooling (cooling intensity) by the cooling air according to the angle positions in the circumferential direction. Specifically, by removing the flow regulating rod 19F, rotating the same by a predetermined angle (for example, 45°) and again attaching the flow regulating rod to the hollow rod 18X, it is possible to adjust a distribution of the degree of cooling. Specifically, by changing the position of the notched portion 19h of the flow regulating rod 19F so as to face the high-temperature portion of the preform 1, it is possible to increase the degree of cooling (cooling intensity) at the high-temperature portion. Note that, the polygonal engaging concave portion 19i and the polygonal engaging convex portion 18f may be any polygonal shape other than the octagonal shape as long as it is a trigonal or more shape.

Seventh Embodiment

Figure 15:
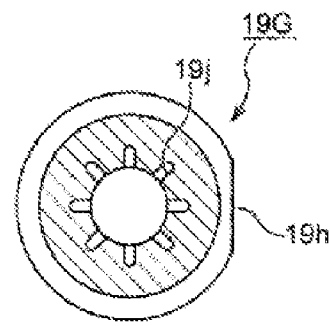
FIG. 15(A) is a cross-sectional view taken along a line XVA-XVA in FIG. 15(B)
FIG. 15(B) is a front cross-sectional view of a seventh embodiment of the flow regulating rod.
FIG. 15(C) is a cross-sectional view taken along a line XVIC-XVIC in FIG. 15(B).
Figure 15:
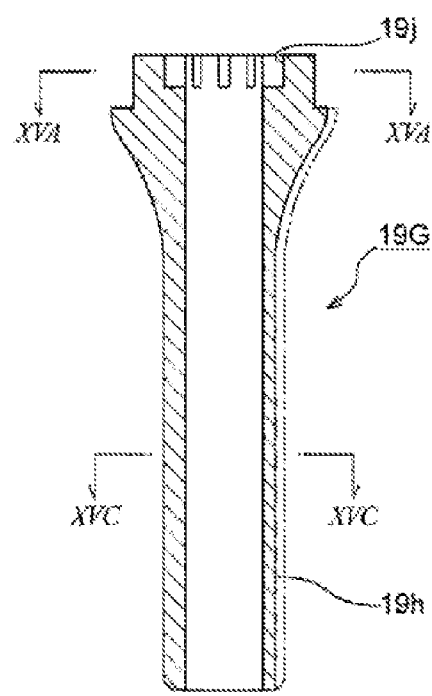
Figure 15:

Sections (A) to (C) in FIG. 15 show a flow regulating rod 19G that is a seventh embodiment of the flow regulating rod.

The flow regulating rod 19G has a plurality of (for example, eight) engaging concave portions 19j provided in equally spaced positions in the circumferential direction of an upper end. Each engaging concave portion 19j has a substantially rectangular or slit shape, and is formed to be recessed toward an outer diameter-side in an inner peripheral surface of a substantially cylindrical recessed portion formed at an upper end of the flow regulating rod 19G.

Figure 16:
FIG. 16(A) is a cross-sectional view taken along a line XVIA-XVIA in FIG. 16(B)
FIG. 16(B) is a front cross-sectional view of another example of the hollow rod to which the flow regulating rod shown in FIG. 15(A), FIG. 15(B)
Figure 16:
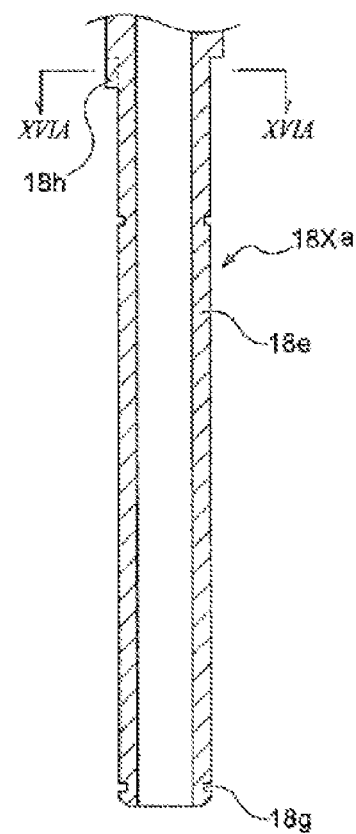

FIG. 16 shows a hollow rod 18Xa for attaching the flow regulating rod 19G. The hollow rod 18Xa also has the sleeve portion 18e integrally provided at a lower end, and is formed with a single engaging convex portion 18h consisting of a single protrusion (a convex portion having a substantially rectangular flat plate shape) protruding in a radial direction in a height position on the way. Therefore, the flow regulating rod 19G is fitted to the sleeve portion 18e of the hollow rod 18Xa from below in FIG. 16 (from a place of an opening end where the compressed air flows in and out), so that one engaging concave portion 19j is oriented and engaged with the single engaging convex portion 18h of the hollow rod 18Xa. More specifically, the single engaging convex portion 18h is fitted to any one of the plurality of engaging concave portions 19j, so that the flow regulating rod 19G is engaged to the hollow rod 18Xa with being oriented (positioned) to a predetermined angle position in the circumferential direction. In addition, a lower end of the flow regulating rod 19G is supported by an engaging member (retaining ring) 23 (refer to FIG. 14) attached to the engaging concave portion 18g for the retaining ring at a lower end of the sleeve portion 18e, and is engaged to the hollow rod 18Xa.

According to this configuration, the gap dimension of the ring-shaped gap 22 is slightly different according to the angle positions in the circumferential direction, so that it is possible to change a degree of cooling (cooling intensity) by the cooling air according to the angle positions in the circumferential direction. Specifically, by engaging and attaching the engaging concave portion 19j, which is different from the engaging concave portion before removing and rotating the flow regulating rod 19G, to the single engaging convex portion 18h of the hollow rod 18Xa, it is possible to adjust the distribution of the degree of cooling. Specifically, by changing the position of the notched portion 19h of the flow regulating rod 19G so as to face the high-temperature portion of the preform 1, it is possible to increase the degree of cooling (cooling intensity) at the high-temperature portion.

FIG. 14 is a schematic view of the temperature adjustment station 20 in a case where the hollow rod 18X and the flow regulating rod 19F (the hollow rod Xa and the flow regulating rod 19G are also similar) are mounted, and the descriptions of parts, which are the same as FIG. 4, are omitted. Note that, in FIG. 14, the cavity 17a (refer to FIG. 4) of the temperature adjustment pot mold 17 is constituted by a single surface without a boundary line (a slit or a parting line) between the stages.

The polygonal engaging concave portion 19i and the polygonal engaging convex portion 18f shown in FIGS. 12 and 13 are not limited to the polygonal shape, and may be engaging portions of various shapes having at least portions corresponding to apexes of the polygon and capable of selectively engaging with each other. The plurality of engaging concave portions 19j shown in FIGS. 15 and 16 may be a plurality of engaging portions of various shapes, and the single engaging convex portion 18h may be two or more engaging convex portions that are selectively engaged to the plurality of engaging portions. Further, in some cases, the arrangement of the engaging convex portion and the engaging concave portion between the flow regulating rod and the hollow rod may be reversed, as compared to the above embodiment.

First Test Example

Figure 17:
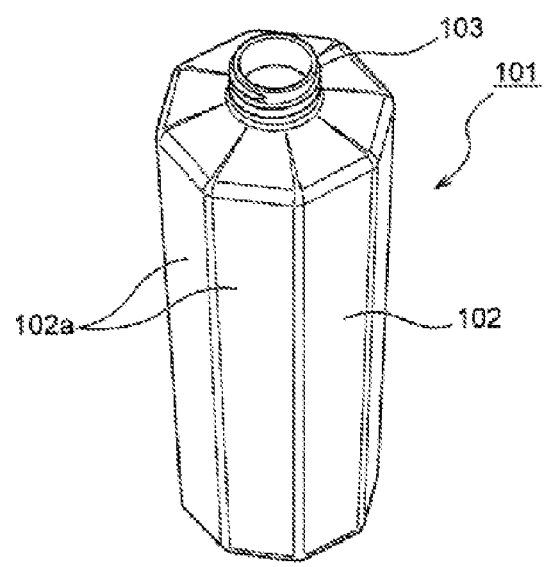
FIG. 17(A), FIG. 17(B), and FIG. 17(C) are respectively a perspective view, a front view and a plan view of a finished container taken out after injection-molding the preform.
Figure 17:
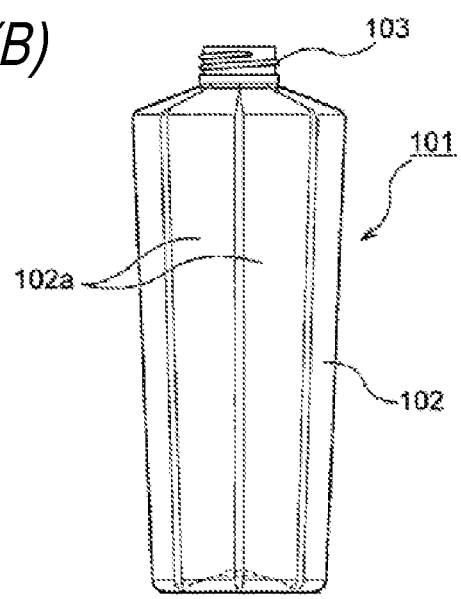
Figure 17:
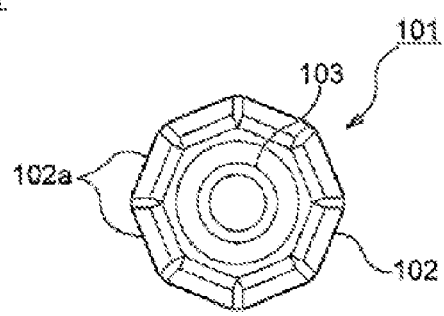
Figure 18:
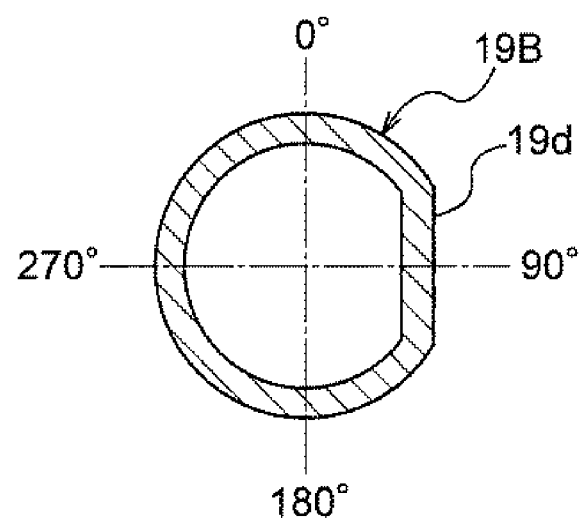
FIG. 18 is a cross-sectional view of the flow regulating rod shown in FIG. 6 FIG. 6(A) and FIG. 6(B).

Subsequently, a first test example is shown in FIGS. 17 to 19.

FIG. 17 shows a finished container 101 such as a PET bottle taken out after the preform 1 is temperature-adjusted and then blow-molded in the blow molding station 30. In this case, a body portion 102 of the container 101 has a regular octagonal cross-section, and has eight side portions 102a.

FIG. 18 schematically shows a cross-section of a flow regulating rod 19B used in the present test, and the flow regulating rod 19B has one notched portion 19d in a direction of 90°.

Sections (A) and (B) in FIG. 19 show measurement results of the thickness t of the container 101 obtained by blow-molding the preform 1 which is measured in positions (8 places corresponding to the octagon) of 45° in a clockwise direction of the container 101. The results correspond to cases where the flow regulating rod 19 is not provided with a notched portion (curve A: solid line), where the one notched portion 19d is provided (curve B: dotted line), and where an aluminum tape is attached to an outer periphery portion other than the notched portion 19d to further narrow an air flow path area other than the notched portion 19d (curve C: dashed-dotted line) (this case corresponds to a case where the dimension of the notched portion 19d is further increased without attaching the aluminum tape), in the temperature adjustment station 20 during the process of molding the container 101. In FIG. 19, the distance in the radial direction from the center is the thickness (mm) of the body portion of the container 101, and the thickness t varies within the range of 0.6 mm to 1.4 mm. The direction of 90° in which the notched portion 19d of the flow regulating rod 19B in FIG. 18 is provided corresponds to the direction of 90° in FIG. 19.

A test procedure is explained. The temperature of the preform 1 is adjusted using the flow regulating rod 19B having one notched portion 10d in the temperature adjustment station 20. Then, the preform 1 is blow-molded to obtain the container 101 in the blow molding station 30. The thickness of the body portion 102 is measured at the place where the height from the bottom portion of the container 101 is 116 mm.

First, the measurement result of section (A) in FIG. 19 is reviewed. When comparing the case (curve B) where the notched portion 19d is provided and the case (curve A) where the notched portion is not provided, the thickness of the body portion 102 of the container in the direction of 135° becomes large in the case (curve B) where the notched portion 19d is provided. In the case (curve C) where the aluminum tape is attached to the portion other than the notched portion 19d to narrow the air flow path area, the thickness of the body portion 102 is further increased. That is, the effect of providing the notched portion 19d is confirmed. The reason why the thickness in the direction of 135°, which deviates by 45° from the direction of 90° at which the notched portion 19d is provided, increases may be because the container 101 has the octagonal shape, so that the tendency remarkably appears on the side portion (or apex portion) adjacent by 45°.

Section (B) in FIG. 19 shows a result of a test that is performed in a similar manner to section (A) in FIG. 19, except that the thickness of the body portion 102 is measured at the place where the height from the bottom portion of the container 101 is 84 mm.

According to this result, when comparing the case (curve B) where the notched portion 19d is provided in the direction of 135° of the container 101, the case (curve A) where the notched portion is not provided, and the case (curve C) where the aluminum tape is attached to the portion other than the notched portion 19d to narrow the air flow path area, the tendency similar to section (A) in FIG. 19 is obtained. However, it can be seen that the thickness is further increased in the case (curve C) where the aluminum tape is attached to the portion other than the notched portion 19d, as compared to section (A) in FIG. 19.

The reason for this result is considered, as follows. Specifically, since the cross-sectional area of the portion of the first air flow path 21a (ring-shaped gap 22) corresponding to the notched portion 19d becomes partially larger than the other portion, the flow path resistance of the air at the corresponding place is lowered. Therefore, it is considered that more air than the other portion is introduced and the cooling efficiency (cooling intensity) is thus relatively increased. In contrast, since the other portion of the first air flow path 21a, which does not correspond to the notched portion 19d, has the smaller flow path cross-sectional area, the flow path resistance is increased. Therefore, it is considered that the amount of air to be introduced is reduced and the cooling efficiency is thus relatively reduced. Therefore, in the temperature adjustment station 20 including the air nozzle 16 having the flow regulating rod 19 having the notched portion 19d and the temperature adjustment pot mold 17, the preform 1 can be efficiently rapidly cooled to suppress whitening (haze, crystallization). In addition, the local (vertical stripe pattern) high-temperature portion of the storage portion 2 of the preform 1 can be selectively cooled to positively eliminate even the temperature unevenness.

Though there is originally the thickness unevenness on the storage portion 2 of the preform 1 before the preform reaches the temperature adjusting device 20, the thickness unevenness can be adjusted to form a uniform thickness of the finished container 101. Alternatively, in some cases, it is possible to give the thickness unevenness on the contrary.

In particular, in a case where so-called multi-cavity of attaching a plurality of (six, in FIG. 1) preforms 1 to one neck mold 50 and conveying the same is performed in the blow molding apparatus 100, for example, when there is a tendency of causing thickness unevenness for the container 101, originating from the third preform of the six preforms in the injection molding station 10, the thickness unevenness of the container 101 can be eliminated by the flow regulating rod 19B having the notched portion 19d in the third temperature adjustment pot mold 17 of the temperature adjustment station 20.

Second Test Example

Subsequently, Table 1 shows a test example showing how the flow rate of the air for preform cooling changes in a case (1) where the flow regulating rod is not provided, and in a case (2) where the flow regulating rod is provided. The setting pressure of the circulation air (cooling air, compressed air) is 0.6 MPa and 0.4 MPa respectively in the case where the flow regulating rod is not provided and in the case where the flow regulating rod is provided, and the circulation air flows in (IN) from the neck side of the preform and flows out (OUT) from the bottom portion of the preform. As for the flow regulating rod, a flow regulating rod without a notched portion as shown in FIGS. 6 and 9 is used.

TABLE 1

| cases | | | (1) | (2) |
|---|---|---|---|---|
| molding cycle | | sec | 15 | 15 |
| flow regulating rod | | | not provided | provided |
| throttle valve | | | not provided | provided |
| circulation blow pressure | setting pressure | MPa | 0.6 | 0.4 |
| | IN | | 0.466 | 0.353 |
| | OUT | | 0.077 | 0.045 |
| low-pressure air flow rate | during molding | L/min | 670 | 483 |
| | during dry operation | (ANR) | 263 | 276 |
| | circulation blow | | 407 | 207 |

In the cases (1) and (2), the supply amount of the circulation air is adjusted for cooling to the temperature at which the substantially same degree of the favorable transparency is obtained so as not to cause whitening, cloudiness and the like for the container 101. As a result, the supply amount (consumption amount) of the circulation air is reduced from 407 L/minute in the case (1) to 207 L/minute in the case (2). Thereby, it can be seen that when the flow regulating rod is provided, the supply amount of the circulation air can be considerably reduced to improve the cooling efficiency of the preform 1 and to reduce the load on the apparatus.

REFERENCE SIGNS LIST 1 (1A, 1B): preform
2: storage portion (main body portion)
2a: body portion
2b: bottom portion
3, 103: neck portion
10: injection molding station
11: injection core mold
12: injection cavity mold
16: air nozzle
16a: air inlet
16b: air outlet
17: temperature adjustment pot mold
17a: temperature adjustment pot mold cavity
18, 18X, 18Xa: hollow rod
18a: sleeve
18b: fixing portion
18c: air outlet hole
18d: circumferential groove
18e: sleeve portion
18f: polygonal engaging convex portion
18g: engaging concave portion for retaining ring
18h: single engaging convex portion
19A to 19G: flow path adjustment rod (flow regulating rod)
19a: outer periphery
19b: screw hole
19c: lower end portion
19d, 19d1, 19d2: notched portion
19e: large-diameter portion
19f: small-diameter portion
19g: tapered portion
19h: notched portion
19i: polygonal engaging concave portion
19j: plurality of engaging concave portions
20: temperature adjustment station
21a: first air flow path
21b: second air flow path
22: ring-shaped gap
23: retaining ring
24: screw
30: blow molding station
40: take-out station
101: container
102: body portion
102a: side portion

The invention claimed is:

1. A temperature adjusting device for adjusting a temperature of an injection-molded bottomed preform, comprising:
a hollow rod member configured to be inserted in the preform held by a holding member to form a first air flow path between the preform and the hollow rod member;
a sleeve fitted and fixed to a lower end of the hollow rod member or integrally provided at a lower end of the hollow rod member; and
a flow path adjustment member that is a separate member from the hollow rod member and is configured to be detachably fitted and attached to an outer periphery of a lower end of the hollow rod member and the sleeve, to adjust a cross-sectional area of the first air flow path at least partially.

2. The temperature adjusting device according to claim 1, wherein an outer periphery of the flow path adjustment member has a circular cross-section.

3. The temperature adjusting device according to claim 1, wherein an outer periphery of the flow path adjustment member has a circular cross-section and has a cross-sectional shape having a notched portion at at least one place in a circumferential direction.

4. The temperature adjusting device according to claim 1, wherein an outer periphery of the flow path adjustment member has an elliptical or polygonal cross-section.

5. The temperature adjusting device according to claim 1, wherein the flow path adjustment member has a cross-sectional shape where an outer diameter of a portion corresponding to a neck portion of the preform is larger than an outer diameter of the other portion, as seen in an axis direction.

6. The temperature adjusting device according to claim 1, wherein an internal space of the hollow rod member has a second air flow path communicating with the first air flow path.

7. The temperature adjusting device according to claim 1, wherein an internal space of the hollow rod member has a second air flow path communicating with the first air flow path, and cooling air is configured to flow into the first air flow path and to be discharged from the second air flow path.

8. A temperature adjusting method of holding an injection-molded bottomed preform by a holding member and adjusting a temperature of the preform in a temperature adjustment station, the method comprising:
inserting a hollow rod member into the preform to form a first air flow path between the preform and the flow path adjustment member, the hollow rod member including a sleeve fitted and fixed to a lower end of the hollow rod member or integrally provided at a lower end of the hollow rod member, a flow path adjustment member that is a separate member from the hollow rod member being detachably fitted and attached to an outer periphery of a lower end of the hollow rod member and the sleeve; and
inserting the hollow rod member, the flow path adjustment member and the preform into a cavity of a temperature adjustment pot mold, and thereafter allowing cooling air to flow in the first air flow path.

9. A resin container manufacturing apparatus comprising:
an injection molding station configured to injection-mold a bottomed preform;
a temperature adjustment station configured to adjust a temperature of the preform molded in the injection molding station; and
a blow molding station configured to blow-mold the preform temperature-adjusted in the temperature adjustment station,
wherein the temperature adjustment station includes:
a hollow rod member is configured to be inserted in the preform held by a holding member to form a first air flow path between the preform and the hollow rod member;
a sleeve fitted and fixed to a lower end of the hollow rod member or integrally provided at a lower end of the hollow rod member; and
a flow path adjustment member that is a separate member from the hollow rod member and is configured to be detachably fitted and attached to an outer periphery of a lower end of the hollow rod member and the sleeve, to adjust a cross-sectional area of the first air flow path at least partially.

10. The temperature adjusting device according to claim 1, further comprising:
an air nozzle fixed concentrically to the hollow rod member,
wherein a radial dimension of a gap between the flow path adjustment member and an inner periphery of the preform is smaller than a radial dimension of a gap between the hollow rod member and the air nozzle.

11. The temperature adjusting device according to claim 10, wherein a radial dimension of the gap between the flow path adjustment member and the inner periphery of the preform is 0.5 mm to 1.5 mm.

12. The temperature adjusting device according to claim 10, wherein a radial dimension of the gap between the flow path adjustment member and the inner periphery of the preform is 0.5 mm to 1.0 mm.

13. The temperature adjusting device according to claim 1, wherein a radial dimension of a gap between the flow path adjustment member and an inner periphery of the preform is 0.5 mm to 1.5 mm.

14. The temperature adjusting device according to claim 1, wherein a radial dimension of a gap between the flow path adjustment member and an inner periphery of the preform is 0.5 mm to 1.0 mm.

* * * * *